_United States Patent Office_ 2,797,441
Patented July 2, 1957

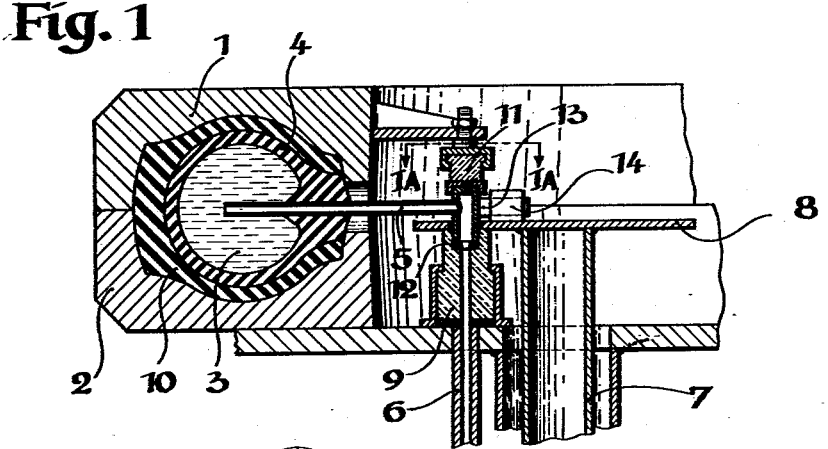
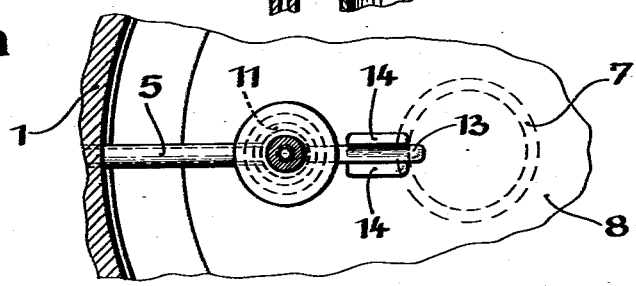
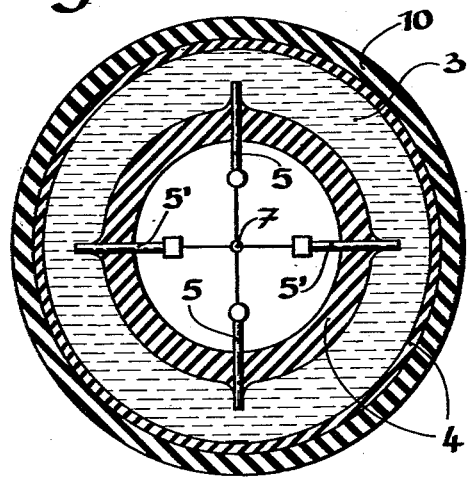
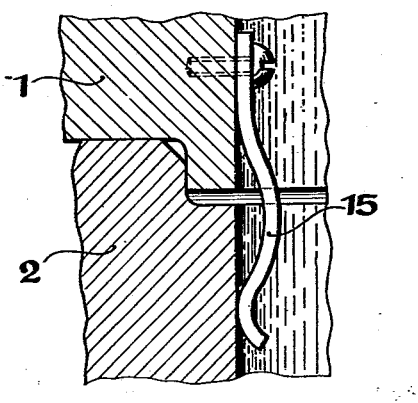

2,797,441

DEVICE FOR HEATING OF MOLDED BODIES, ESPECIALLY TIRES, IN AN ELECTRIC HIGH-FREQUENCY ALTERNATING FIELD

Heinrich Bauermeister and Hans-Dieter Krug, Hannover, Germany, assignors to Continental Gummi-Werke Aktiengesellschaft, Hannover, Germany Application April 30, 1954, Serial No. 426,802

Claims priority, application Germany May 2, 1953

5 Claims. (Cl. 18—38)

The present invention concerns a device for preheating or vulcanizing molded bodies of rubber or the like, especially vehicle tires, in an electric high-frequency alternating field, with which an outer electrode is formed by a mold adapted to be closed while an inner electrode is formed by an electric conductor, preferably an electrically conductive filling of an inflateable body inserted into the mold.

With devices of the above mentioned type it is possible to employ the diametrically oppositely located plug-in valves or studs which serve as inlet and outlet for an inflating means as electric connection with said inflating means which has been made electrically conductive and serves as inner electrode.

While it has been known for a long time that the high-frequency lost heat can be employed for heating of poorly or non-conductive material, the present state of the art is characterized by attempts to exploit this finding particularly in connection with the manufacture of articles provided with a hollow space such as vehicle tires. A general exploitation of the said finding failed, however, up to the time preceding this invention due to the fact that it was not possible to provide arrangements which are safe in operation and can be mass produced although the field of the capacitive heating has theoretically been mastered for a long time.

Particular difficulties have been encountered in connection with the treatment of vehicle tires. This is due to the fact that the heating hose required for pressing the unvulcanized rubber and also the well-known substitutes therefor with possible conductors therein have to be inserted into the mold together with the unvulcanized tire and also have to be removed together therewith from said mold. It is thus necessary when preheating or vulcanizing each tire, to take care that a fast and safe electric connection is established between the inner electrode and the supply lines therefor.

It is, therefore, an object of the present invention to provide a device for preheating or vulcanizing molded bodies of rubber or the like especially vehicle tires, which will overcome the above mentioned difficulties.

It is another object of this invention to provide an arrangement of the above mentioned type which will automatically safeguard the operator handling the mold against any dangers which might be brought about by improper electric connections in the arrangement.

It is still another object of this invention to provide a device for preheating or vulcanizing molded bodies of rubber or the like, especially vehicle tires, in which proper electric connections will automatically be effected when the mold is being closed.

These and other objects and advantages of the invention will appear more clearly from the following specification in connection with the accompanying drawing in which:

Fig. 1 is a vertical partial section through a vulcanizing device for pneumatic tires.

Fig. 1a is a section taken along the line 1a—1a of Fig. 1.

Fig. 2 is a top view upon the annular inner electrode with its supply connections, the outer electrode being omitted for the sake of clarity of the drawing.

Fig. 3 shows a detail.

General arrangement

The problem of establishing a fast and safe electric connection between the inner electrode and its supply lines when preheating or vulcanizing a tire has been solved according to the present invention by causing the closing pressure of the mold portions automatically to establish the contact between the inner electrode and the current supply lines therefor. The operator, therefore, can operate the vulcanizing press equipped with the arrangement of the present invention in the same manner as he used to do heretofore with steamheated installations. Additional manipulations which otherwise might make the operation more difficult are not required with the arrangement of the invention because the electric connection is automatically effected when closing the press with a maximum safety of operation.

According to a further development of the invention, the conductor of the transformation or adaptation circuit which is associated with the inner electrode may end in a contact plate which when closing the mold is contacted by the connections which are electrically connected with the inner electrode, if desired through the intervention of special contacts arranged on said connections.

The safety of operation of the arrangement is furthermore increased due to the fact that in conformity with the invention the contacts of the supply connections and/or the contact plate in the direction of closing the mold are yieldably mounted or the contacts are so designed that a connection will be established in the manner of a knife blade switch. A faulty contact making which could be effected by the drive out penetrating into the separating line of the mold portions when the latter are not uniformly spaced from each other, is thereby eliminated.

A further feature of the present invention consists in that unnecessarily high transfer resistances between those portions of the mold which serve as outer electrodes which may likewise be caused by the drive out, are eliminated by providing the mold portions with contacts distributed over their circumference, which contacts when the mold is closed become effective and thus assure an electric short-circuit between the mold portions.

According to a still further feature of the present invention the arrangement of two electric connections for the electrically conductive filling is replaced by conveying the electric energy through more than two, preferably four or more supply points which are evenly distributed over the circumference. It has been found that by such an arrangement it is possible not only to transfer a considerably greater energy but that also a considerably more uniform electric field is established in comparison to those arrangements which use only two electric connections. It is, of course, understood that the present invention is not limited to four current supply connections but that it is also possible to provide more than four supply connections. It is furthermore possible to provide individual or pairs of connections for solving special problems. The employment of more than two supply connections is also possible with such devices where the contact making is not established automatically by the closing of the form portions.

Structural arrangement

Referring now to the drawing in detail, the arrangement shown in Fig. 1 comprises an outer electrode composed of the portions 1 and 2 of the vulcanizing mold. The inner electrode is formed by the electrically conductive filling 3 of the heating hose 4 which is provided with plug valves 5 through which the pressure fluid is introduced into the heating hose 4. Electric energy is conveyed to the two electrodes 1, 2 and 3 through concentric hollow conductors 6 and 7. The outer conductor 6 is electrically connected with the outer electrode 1, 2, while the inner conductor 7 is electrically connected through connections 5 with the inner electrode 3. The hollow conductor 7 ends in a copper contact plate 8 which is supported by ceramic insulators 9.

When the vulcanizing mold is open, the unvulcanized tire 10 is together with the heating hose 4 inserted into the mold portion 2. When the mold is being closed, the supports 11 consisting of ceramic material grip the connections 5 so that said connections will in a sealing manner lie in the bores 12 of the supporting insulators 9. Radially inwardly located ends of the connections 5 are provided with contact flags 13 which engage fork-shaped contacts 14 of the contact plate 8 so that when the mold is closed, on one hand the supply of the pressure fluid and on the other hand a safe contact making between the connections 5 and the contact plate 8 is assured.

According to Fig. 2, the inner electrode 3 is provided with electric connections 5, 5' which are evenly distributed over the circumference of the vulcanizing mold. Of these electric connections 5, 5', the connections 5' merely take part in the energy supply but not in the supply of fluid pressure means. Therefore, the connections 5' may consist of solid rods or hollow members such as blind flanged hollow conductors. This arrangement makes it possible to convey to the inner electrode 3 considerably more energy than this is possible with only two supply connections 5. Furthermore a considerably more uniform electric field is established between the inner electrode and the outer electrode. It may also be mentioned that the radially inwardly located ends of the supply connections 5' may be provided with mere simple contact blocks which in a manner illustrated in Fig. 1 are pressed by corresponding bearings or supports 11 against the contact plate 8.

According to the showing of Fig. 3, the upper portion of the vulcanizing mold may have its radially inwardly located surfaces provided with contact springs 15 which are electrically connected with this mold portion. When the mold is being closed, the contact springs 15 contact the lower portion 2 of the mold whereby an electric short-circuit is established between the mold portions, even when the mold portions 1 and 2 due to the drive out do not properly contact each other.

It is, of course, understood that the present invention is, by no means, limited to the particular constructions shown in the drawing but also comprises any modifications within the scope of the appended claims.

What we claim is:

1. A device for preheating or vulcanizing molded bodies of rubber or similar material, especially vehicle tires, in an electric high-frequency alternating field, which comprises in combination: a tire mold including a plurality of mold parts adapted selectively to be moved toward each other for closing or opening the mold, said mold being arranged for connection with a high-frequency electric source and to serve as a first electrode, a second electrode inserted in said mold in spaced relationship thereto to allow the insertion of a body to be heated between said mold and said second electrode, first contact means fixedly connected to said second electrode for conveying current thereto, contact plate means fixedly arranged for connection with said high-frequency electric source, and second contact means fixedly connected to said contact plate means and arranged firmly to engage first said contact means in response to the closure of said mold.

2. A device according to claim 1, in which at least either one of said contact means is yieldable in the direction of closure of said mold.

3. In an apparatus for heating molded bodies of rubber and similar material, especially vehicle tires, in an electric high-frequency alternating field: a tire mold composed of a plurality of mold members adapted selectively to be moved into mold closing or opening position, said mold being arranged for connection with one pole of a high-frequency electric current source and to serve as an electrode, a curing bag removably arranged in said mold and provided with electric current conveying means extending through said curing bag, said mold being adapted to receive a tire to be heated between said curing bag and the inner walls of said mold, first contact means arranged stationarily for connection with the other pole of said high-frequency electric current source, second contact means fixedly connected to said electric curernt conveying means so as to be movable therewith and with said curing bag for engaging said first contact means, said second contact means automatically placing itself into alignment with said first contact means when said curing bag is assuming its normal position in said mold, and means connected to one of said mold members and adapted in response to the movement thereof into mold closing position to move said second contact means into firm engagement with said first contact means.

4. A device according to claim 3, in which at least one part of the mold has connected thereto contact means arranged in response to at least near closure of the mold electrically to interconnect the mold members.

5. In a device for heating molded bodies of rubber and similar material, especially vehicle tires, in an electric high-frequency alternating field, the combination of: a mold composed of a plurality of mold members arranged selectively to be closed or opening, electric conductor means electrically connected with said mold and arranged for connection with a high-frequency electric current source, said mold forming a first electrode, a curing bag arranged in said mold and inflated by fluid forming a second electrode, fluid and current conveying means extending into said mold through said curing bag, first contact means fixedly connected to said conveying means so as to form a unit therewith, second contact means arranged stationarily for connection with said high-frequency electric current source, and means including insulating means fixedly connected to one of said mold members and arranged automatically in response to at least an approximate closing of said mold positively to close an electric circuit through said first and second contact means, said circuit comprising said current conveying means, said fluid, said high-frequency electric current source, and said conductor means.

References Cited in the file of this patent

UNITED STATES PATENTS 2,541,644     Enabnit _____ Feb. 13, 1951